US012808661B2

(12) United States Patent
Kurahashi

(10) Patent No.: US 12,808,661 B2
(45) Date of Patent: Nov. 24, 2026

(54) INFORMATION PROCESSING DEVICE, CONTROL METHOD, PROGRAM, AND STORAGE MEDIUM

(71) Applicants: PIONEER CORPORATION, Tokyo (JP); PIONEER SMART SENSING INNOVATIONS CORPORATION, Tokyo (JP)

(72) Inventor: Makoto Kurahashi, Kawagoe (JP)

(73) Assignees: PIONEER CORPORATION, Tokyo (JP); PIONEER SMART SENSING INNOVATIONS COPORATION, Tokyo (JP)

( * ) Notice: Subject to any disclaimer, the term of this patent is extended or adjusted under 35 U.S.C. 154(b) by 120 days.

(21) Appl. No.: 18/842,992

(22) PCT Filed: Mar. 7, 2023

(86) PCT No.: PCT/JP2023/008599
§ 371 (c)(1),
(2) Date: Aug. 30, 2024

(87) PCT Pub. No.: WO2023/171672
PCT Pub. Date: Sep. 14, 2023

(65) Prior Publication Data
US 2025/0172388 A1 May 29, 2025

(30) Foreign Application Priority Data
Mar. 8, 2022 (JP) ................................ 2022-035112

(51) Int. Cl.
*G01B 11/28* (2006.01)
*G01S 17/02* (2020.01)

(52) U.S. Cl.
CPC ............. *G01B 11/28* (2013.01); *G01S 17/02* (2013.01)

(58) Field of Classification Search
CPC ....... G01B 11/28; G01S 17/02; G01S 7/4808; G01S 17/66; G01S 17/89; G01S 17/931; G01S 17/42
See application file for complete search history.

(56) References Cited

U.S. PATENT DOCUMENTS

2005/0243301 A1* 11/2005 Takagi .................. G08G 1/163 356/139.1
2014/0159925 A1 6/2014 Mimeault et al.
(Continued)

FOREIGN PATENT DOCUMENTS

EP 1419402 B1 4/2006
EP 3832532 A2 6/2021
(Continued)

OTHER PUBLICATIONS

Chen et al., "Likelihood-Field-Model-Based Dynamic Vehicle Detection and Tracking for Self-Driving", IEEE Transactions on Intelligent Transportation Sysemts, vol. 17, No. 11, Nov. 2016.
(Continued)

*Primary Examiner* — Thanh Luu
*Assistant Examiner* — Mai Thi Ngoc Tran
(74) *Attorney, Agent, or Firm* — Procopio, Cory, Hargreaves & Savitch LLP

(57) ABSTRACT

The controller 13 of the information processing device 1 mainly functions as an acquisition unit, a surface detection unit, a direction estimation unit, and the entire area estimation unit. The acquisition unit is configured to acquire measurement data outputted by a measurement device. The surface detection unit is configured to detects at least one surface of an object from the measurement data. The direction estimation unit is configured to estimate a direction of the object based on the detected surface. The entire area estimation unit is configured to estimate an entire area of the
(Continued)

object based on the estimated direction and the measurement data.

10 Claims, 9 Drawing Sheets

(56) References Cited

U.S. PATENT DOCUMENTS

| | | | |
|---|---|---|---|
| 2017/0146655 A1 | 5/2017 | Yasui et al. | |
| 2019/0179332 A1* | 6/2019 | Cheng | G06V 20/58 |
| 2020/0081095 A1 | 3/2020 | Lin | |
| 2021/0150230 A1 | 5/2021 | Smolyanskiy et al. | |
| 2021/0209785 A1* | 7/2021 | Unnikrishnan | G06V 10/764 |
| 2022/0012466 A1* | 1/2022 | Taghavi | G06F 18/2163 |

FOREIGN PATENT DOCUMENTS

| | | |
|---|---|---|
| JP | 2017-096792 A | 6/2017 |
| JP | 2018-009831 A | 1/2018 |
| JP | 2019-152575 A | 9/2019 |
| JP | 2020-032986 A | 3/2020 |
| JP | 2020-042800 A | 3/2020 |
| JP | 2021-039689 A | 3/2021 |

OTHER PUBLICATIONS

Yin et al., "Center-based 3D Object Detection and Tracking" 2021 IEEE/CVF Conference on Computer Vision and Pattern Recognition (CVPR), 2021.
European Search Report issued on the corresponding European Patent Appln. No. 23766848.8 on Feb. 3, 2026, in 13 pages.
Patent Cooperation Treaty, International Search Report, Application No. PCT/JP2023/008599, dated May 16, 2023, in 4 pages.

* cited by examiner

INFORMATION PROCESSING DEVICE, CONTROL METHOD, PROGRAM, AND STORAGE MEDIUM

CROSS-REFERENCE TO RELATED APPLICATIONS

This application is US National Stage of International Patent Application PCT/JP2023/008599, filed on Mar. 7, 2023, which claims benefit to Japanese Patent Application 2022-035112, filed on Mar. 8, 2022, the contents of both of which are incorporated herein by reference.

TECHNICAL FIELD

The present disclosure relates to processing of measured data.

BACKGROUND

Conventionally, there is known a laser radar device configured to radiate a pulse of laser light into a target space of detection and detect an object in the target space based on the level of the reflection light. For example, Patent Literature 1 discloses a lidar configured to scan the peripheral space by appropriately controlling the emission direction (scanning direction) of the light pulse to be repeatedly emitted and measure the return light thereby to generate point cloud data indicating peripheral object information such as distance information and reflectance information. Further, Patent Literature 2 discloses a technique of an object tracking process by detecting, based on the point cloud data, an object bounding box surrounding an object and associating time-series object bounding boxes.

PRIOR ART DOCUMENTS

Patent Literature

Patent Literature 1: JP2018-009831A
Patent Literature 2: JP2020-042800A

SUMMARY

Problem to be Solved by the Invention

When the representative position of an object is determined from the point cloud data obtained by measuring the object, the measured part of the object varies with time depending on the appearance of the object visible from the measurement device. As a result, there is an issue that the representative position of the object estimated from the point cloud data is scattered on the object.

The present disclosure has been made to solve the above issue, and it is an object of the present invention to provide an information processing device capable of stably determining the representative position of an object.

Means for Solving the Problem

One invention is an information processing device including:

- an acquisition unit configured to acquire measurement data outputted by a measurement device;
- a surface detection unit configured to detect at least one surface of an object from the measurement data;
- a direction estimation unit configured to estimate a direction of the object based on the surface; and
- an entire area estimation unit configured to estimate an entire area of the object, based on the direction and the measurement data.

Another invention is a control method executed by a computer, the control method including:

- acquiring measurement data outputted by a measurement device;
- detecting at least one surface of an object from the measurement data;
- estimating a direction of the object based on the surface; and
- estimating an entire area of the object, based on the direction and the measurement data.

Still another invention is a program causing a computer to:

- acquire measurement data outputted by a measurement device;
- detect at least one surface of an object from the measurement data;
- estimate a direction of the object based on the surface; and
- estimate an entire area of the object, based on the direction and the measurement data.

BRIEF DESCRIPTION OF THE DRAWINGS

FIG. 4B is a bird's-eye view showing a condition of another vehicle together with detected segments of the vehicle and the representative positions thereof according to the comparative example.

DETAILED DESCRIPTION OF PREFERRED EMBODIMENTS

Figure 1:
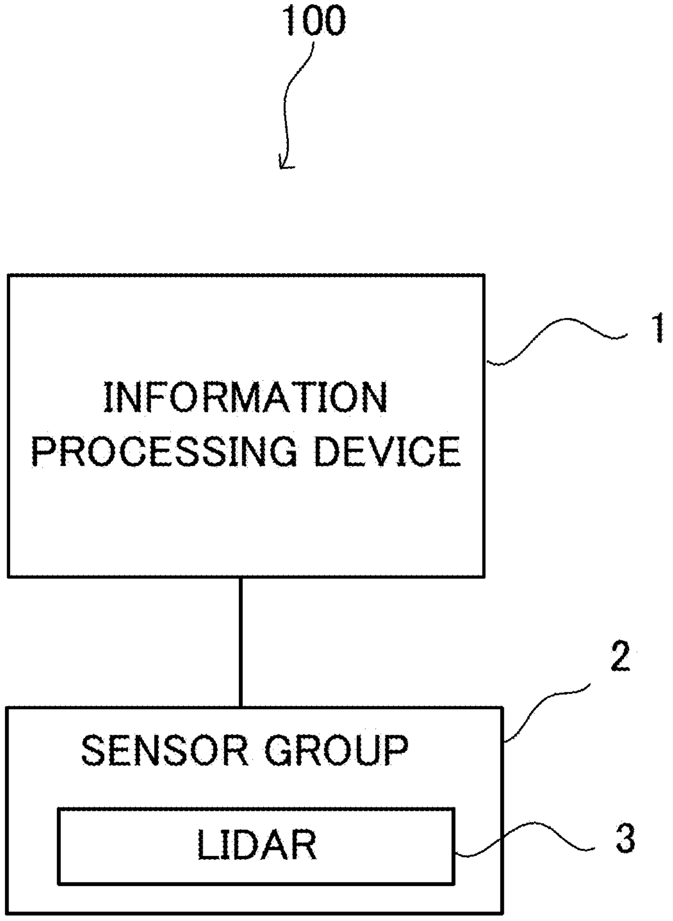
FIG. 1 It is a schematic configuration of a lidar unit according to the embodiment.

According to a preferred embodiment of the present invention, the information processing device includes: an acquisition unit configured to acquire measurement data outputted by a measurement device; a surface detection unit configured to detect at least one surface of an object from the measurement data; a direction estimation unit configured to estimate a direction of the object based on the surface; and an entire area estimation unit configured to estimate an entire area of the object, based on the direction and the measurement data. According to this embodiment, the information processing device is capable of accurately estimating the entire area of an object required to stably determine the representative position of the object.

In one aspect of the information processing device, the information processing device further includes a size estimation unit configured to estimate a size of the object, based on a segment representing the object detected from the measurement data, wherein the entire area estimation unit is configured to estimate the entire area, based on a history of the sizes estimated based on the measurement data in which the object is detected, the direction, and the surface. According to this aspect, the information processing device can grasp the size of the object and accurately estimate the entire area of the object.

In another aspect of the information processing device, the entire area estimation unit is configured to exclude a predetermined number of top sizes from the history, and estimate the entire area. According to this aspect, the information processing device can accurately estimate the entire area of the object in consideration of noise.

In still another aspect of the information processing device, the object is a vehicle, and the surface detection unit is configured to detect the at least one surface of the vehicle from the measurement data. In some embodiments, the surface detection unit is configured to detect data representing reflectors of the vehicle from the measurement data and detect a rear side surface of the vehicle based on the data. According to this aspect, the information processing device can accurately estimate the entire area of the vehicle.

In still another aspect of the information processing device, the measurement device generates the measurement data including a reflection intensity value for each measurement direction by receiving reflected light of emitted light, wherein the surface detection unit is configured to detect the surface based on the reflection intensity value. According to this aspect, the information processing device can accurately detect the surface of the object having a characteristic in reflectance.

In still another aspect of the information processing device, the information processing device further includes a representative position determination unit configured to determine a representative position of the object based on the entire area. In some embodiments, the information processing device further includes a tracking unit configured to track the object based on the transition of the representative position in time series. According to this aspect, the information processing device can accurately determine the representative position of the object and track the object with high accuracy.

In still another aspect of the information processing device, the information processing device further includes a segment detection unit configured to detect a segment representing the object, wherein the surface detection unit is configured to detect the surface based on the segment. According to this aspect, the information processing device is capable of accurately detecting the surface of the object.

According to another preferred embodiment of the present invention, a control method executed by a computer includes: acquiring measurement data outputted by a measurement device; detecting at least one surface of an object from the measurement data; estimating a direction of the object based on the surface; and estimating an entire area of the object, based on the direction and the measurement data. By executing this control method, the information processing device can accurately estimate the entire area of an object that is required to stably determine the representative position of the object.

According to still another preferred embodiment of the present invention, a program causing a computer to: acquire measurement data outputted by a measurement device; detect at least one surface of an object from the measurement data; estimate a direction of the object based on the surface; and estimate an entire area of the object, based on the direction and the measurement data. By executing this program, the computer can accurately estimate the entire area of the object which is required to stably determine the representative position of the object. In some embodiments, the program is stored in a storage medium.

EMBODIMENTS

Hereinafter, a preferred embodiment of the present invention is described below with reference to drawings.

(1) Overview of Lidar Unit

Figure 2:
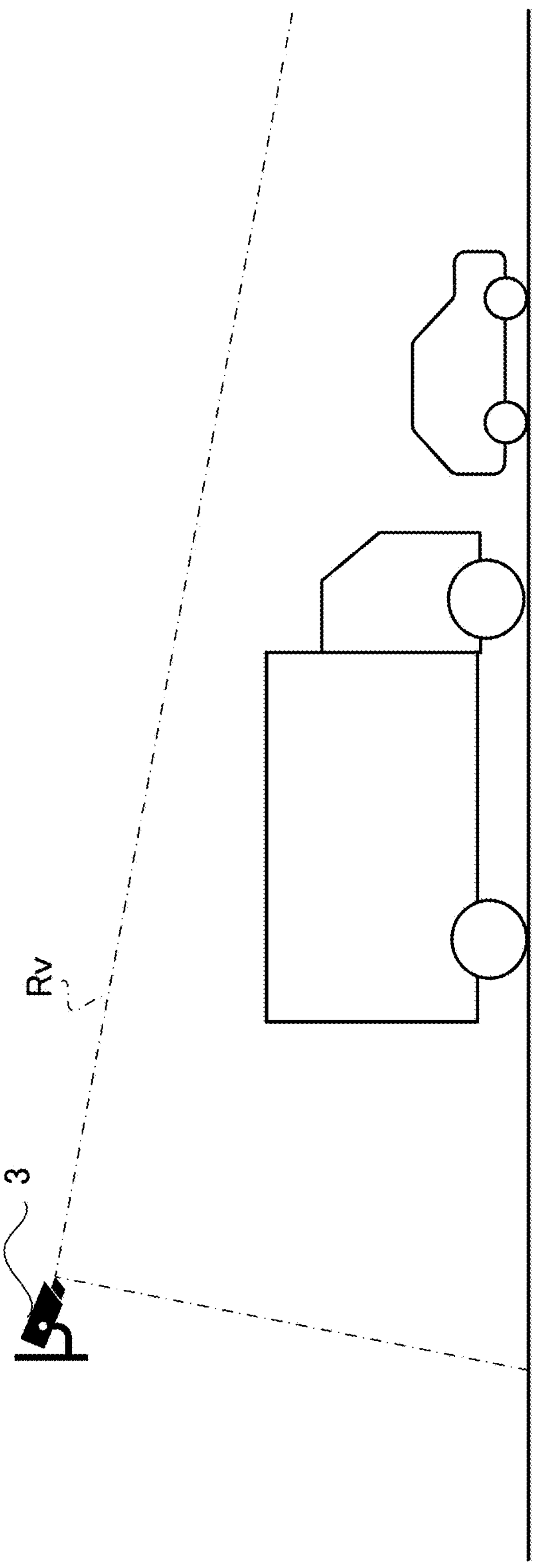
FIG. 2 It illustrates an installation example of a lidar for measuring vehicles on the road.

FIG. 1 is a schematic configuration of a lidar unit 100 according to the embodiment. The lidar unit 100 includes an information processing device 1 that performs processing related to data generated by a sensor group 2, and the sensor group 2 including at least a lidar (Lidar: Light Detection and Ranging, or Laser Illuminated Detection and Ranging) 3. FIG. 2 illustrates an installation example of the lidar 3 for measuring vehicles on a road. The lidar 3 shown in FIG. 2 is installed so as to include a road in the field of view "Rv" which is the measurable range of the lidar 3. In practice, the field of view Rv ranges according to the maximal measurement distance of the lidar 3. The lidar unit 100 detects vehicles and outputs information regarding the detection result of the vehicles. In some embodiments, the lidar 3 may be installed to include a parking lot or the like in the field of view Rv, instead of being installed to include a road in the field of view Rv.

The information processing device 1 is electrically connected to the sensor group 2 by wire or wirelessly, and processes data outputted by various sensors included in the sensor group 2. In the present embodiment, the information processing device 1 performs a process (also referred to as "vehicle detection process") of detecting a vehicle on the road based on the point cloud data outputted by the lidar 3. The vehicle detection process includes processes related to the state estimation of the vehicle such as the position estimation of the vehicle and the tracking of the vehicle. For example, the information processing device 1 is fixedly installed in a condition of being accommodated in the housing body together with the lidar 3. The information processing device 1 may be provided integrally with the lidar 3 as an electronic control device of the lidar 3 or may be provided at a position away from the lidar 3 in a state where it can communicate with the lidar 3.

The lidar 3 discretely measures the distance to an external object by emitting a pulse laser which is an infrared laser while changing the emitting angle within a predetermined angle range in the horizontal and vertical directions. In this case, the lidar 3 is equipped with a radiation unit for radiating a laser light while changing the irradiation direction (i.e., the scanning direction), a light receiving unit for receiving the reflected light (scattered light) of the radiated laser light, and an output unit for outputting data based on the received light signal outputted by the light receiving unit. Then, the lidar 3 generates point cloud data using the lidar 3 as a reference point, wherein the point cloud data indicates, for each measurement direction (i.e., each emitting direction of the pulse laser), the distance (measurement distance) to the object irradiated with the pulsed laser and the received light intensity (reflection intensity value) of the reflected light. In this case, the lidar 3 calculates, as the time of flight (Time of Flight) of the light, the time length from the time of the emission of the pulsed laser to the time of detection of the reflected light by the light receiving unit, and then determines the measurement distance according to the calculated time of flight. Hereafter, point cloud data obtained by one cycle of measurement to the entire field of view Rv is also referred to as a frame of point cloud data.

The point cloud data can be regarded as an image in which each pixel corresponds to each measurement direction and the pixel value corresponds to the reflection intensity value in each measurement direction. In this case, the emitting direction of the pulse laser in the elevation/depression angle varies along the vertical direction of the pixels and the emitting direction of the pulse laser in the horizontal angle varies along the horizontal direction of the pixel. Then, for each pixel, the coordinate value in the three-dimensional coordinate system with reference to the lidar 3 is obtained based on the corresponding set of the emitting direction and the measurement distance.

The lidar 3 is not limited to the above-described scan type lidar and may be a flash type lidar configured to generate three-dimensional data by diffusing and radiating a laser light to the field of view of the two-dimensional sensor array. Hereafter, the point (and its measurement data) measured through irradiation with the pulse laser emitted by the radiation unit is also referred to as "measured point". The lidar 3 is an example of the "measurement device" in the present invention.

The sensor group 2 may include various external or/and internal sensors in addition to lidar 3. For example, the sensor group 2 may include a GNSS (Global Navigation Satellite System) receiver or the like required to generate the position data.

(2) Configuration of Information Processing Device

Figure 3:
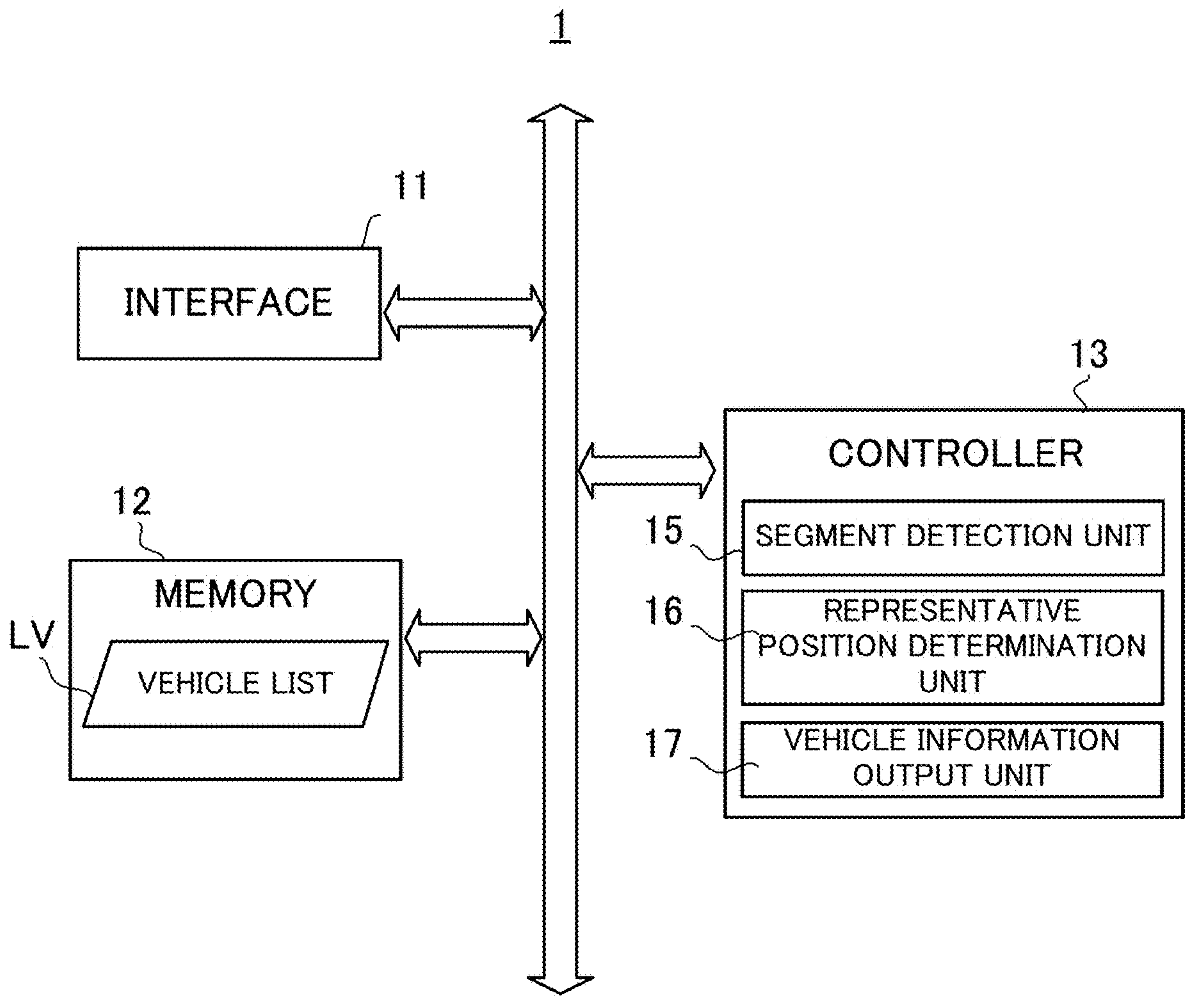
FIG. 3 It is a block diagram showing an example of a hardware configuration of an information processing device.

FIG. 3 is a block diagram illustrating an example of a hardware configuration of the information processing device 1. The information processing device 1 mainly includes an interface 11, a memory 12, and a controller 13. Each of these elements is connected to each other through a bus line.

The interface 11 performs the interface operation related to the transfer of data between the information processing device 1 and an external device. In this example, the interface 11 acquires the output data from the sensor group 2 such as a lidar 3, and supplies the controller 13 with the data. Examples of the interface 11 include a wireless interface, such as a network adapter, for performing wireless communication, and a hardware interface, such as a cable, for connecting to an external device. The interface 11 may also perform interface operations with various peripheral devices such as an input device, a display device, a sound output device, and the like.

The memory 12 is configured by various volatile and non-volatile memories such as a RAM (Random Access Memory), a ROM (Read Only Memory), a hard disk drive, and a flash memory, and the like. The memory 12 stores a program for the controller 13 to perform a predetermined process. The program executed by the controller 13 may be stored in a storage medium other than the memory 12.

The memory 12 also stores information necessary for the controller 13 to perform a predetermined process. For example, in the present embodiment, the memory 12 stores a vehicle list LV. The vehicle list LV is a list of detected vehicles generated in the vehicle detection process, and is generated per frame cycle. For example, the identification information (detected vehicle ID) is assigned to each detected vehicle, and the detected vehicles are listed with the detected vehicle ID in the vehicle list LV. Here, if there is a vehicle detected at different processing times in the vehicle detection process, the detected vehicle is managed with a common detected vehicle ID based on the vehicle tracking information to be described later.

The memory 12 also stores information regarding the history of the size (e.g., the length and width of the vehicle) of each detected vehicle estimated based on the detection result of each detected vehicle. In this instance, for each detected vehicle ID listed in the vehicle list LV, the memory 12 stores information (also referred to as "past size information") indicating the largest size among the records of the size estimated in the past. The past size information is generated by the controller 13. In some embodiments, the memory 12 may store not only the past size information but also prior information (also referred to as "prior size information") on the vehicle size. In this case, the prior size information may be information indicating a general size of a vehicle, or may be information indicating the size for each vehicle type. In addition to the prior information regarding the size of the vehicle, the memory 12 may further store the prior information regarding the distribution of the reflection intensity of objects in advance. This prior information may be, for example, information indicating the existence of a strong reflection intensity portion (due to the reflector) on the rear of a vehicle.

The controller 13 includes one or more processors, such as a CPU (Central Processing Unit), a GPU (Graphics Processing Unit), and a TPU (Tensor Processing Unit), and controls the entire information processing unit 1. In this case, the controller 13 executes a program stored in the memory 12 or the like to perform various processing described later. The controller 13 functionally includes a segment detection unit 15, a representative position determination unit 16, and a vehicle information output unit 17.

The segment detection unit 15 extracts a mass (also referred to as "segment") of data indicating neighboring positions from the point cloud data generated in the frame cycle corresponding to the current processing time. Then, the segment detection unit 15 detects a segment (also referred to as "vehicle segment") that is estimated to represent a vehicle from the extracted segments. Then, the segment detection unit 15 generates the vehicle list LV that is a list of the detected vehicles based on the detection result of the vehicle segments.

In this case, the segment detection unit 15 extracts one or more segments from the point cloud data on the basis of an arbitrary clustering technique such as Euclidean Clustering. Then, the segment detection unit 15 detects one or more segments satisfying a predetermined condition from the extracted segments as vehicle segments. The predetermined condition described above is, for example, a condition relating to the size or shape of the segment. For example, the segment detection unit 15 detects, as a vehicle segment, a segment which includes a predetermined number or more of measured points as its components. In some embodiments, the segment detection unit 15 may perform detection of a vehicle segment using a vehicle detection model that is trained based on deep learning (neural network). In this case, the vehicle detection model is, for example, a model based on instance segmentation, and is trained in advance so as to output a vehicle segment when point cloud data represented in a predetermined tensor format is inputted to the model.

The segment detection unit 15 may further determine the classification of each detected vehicle based on the size or the like (e.g., whether it is a large-sized vehicle or a standard-sized vehicle). In this case, for example, the segment detection unit 15 identifies a vehicle segment which satisfies a predetermined condition (e.g., the number of measured points is equal to or larger than a predetermined number) as a segment of a large-sized vehicle while identifies any other vehicle segment as a standard-sized vehicle. In another example, the segment detection unit 15 may classify a vehicle segment based on the output result from the above-described vehicle detection model that is trained to output the classification result in accordance with the size of the detected vehicle.

The representative position determination unit 16 first performs a process of determining the correspondence between the vehicle segment and the tracked object. The term "tracked object" herein indicates a target vehicle of tracking which has been detected at the past time. In this case, the representative position determination unit 16 performs the tracking based on the transition of the time series representative positions of the center point of the vehicle segment. In this case, for example, using the center point of the vehicle segment and an arbitrary object tracking model, the representative position determination unit 16 determines whether or not time series vehicle segments detected in consecutive frame cycles represent the same vehicle. The object tracking model may be a model based on a Kalman filter, or may be a model based on deep learning.

Next, based on the vehicle segment, the representative position determination unit 16 detects a surface (also referred to as "vehicle surface") of the detected vehicle on at least one side of the vehicle and the direction (orientation) of the detected vehicle. Then, the representative position determination unit 16 estimates the size (e.g., width and length) of the detected vehicle based on the vehicle segment obtained in each frame cycle. Then, based on the estimation result of the size (for example, width and length) of the detected vehicle, the representative position determination unit 16 performs a process of updating the past size information to be included in the vehicle list LV. In this case, the representative position determination unit 16 generates the past size information indicating the estimated size of the vehicle for such a detected vehicle to which the past size information is not linked. On the other hand, for such a detected vehicle to which the past size information is already linked, the representative position determination unit 16 updates the past size information according to the estimated size of the vehicle if the estimated size of the detected vehicle is larger than the size of the detected vehicle indicated by the past size information.

Then, based on the vehicle surface and the direction of each detected vehicle and the latest past size information, the representative position determination unit 16 determines the representative position of each detected vehicle listed in the vehicle list LV. The term "representative position" herein indicates a position of a predetermined representative point of a vehicle, and it may be a center position of the vehicle, or may be a center position of the head of the vehicle, or may be any other predetermined position on the vehicle. In this case, based on the detected vehicle surface, the direction of the detected vehicle identified based on the vehicle surface, and the past size information, the representative position determination unit 16 estimates the entire area of the detected vehicle and estimates the representative position thereof from the estimated entire area. If there is no available past size information for the detected vehicle of interest, the representative position determination unit 16 may estimate the entire area using the prior size information instead of the past size information. Details of the estimation method of the representative position will be described later.

Then, the representative position determination unit 16 updates the estimated position of each detected vehicle using the determined representative position of each detected vehicle as an observed value.

The vehicle information output unit 17 outputs information regarding vehicles detected by the lidar 3. In this case, for example, based on the processing result by the representative position determination unit 16, the vehicle information output unit 17 may output information regarding the number of detected vehicles during a predetermined period, or may output information regarding the position and/or the speed of each detected vehicle. In this case, as an embodiment of the output, the vehicle information output unit 17 may store the above-described information in the memory 12 or may transmit, through the interface 11, the information to the server device that collects the information on traveling vehicles for each road.

The controller 13 functions as the "acquisition unit", the "size estimation unit", the "segment detection unit", the "representative position determination unit", the "tracking unit", and a computer which executes the program.

The process performed by the controller 13 is not limited to being implemented in software using a program, and may be implemented by any combination of hardware, firmware, and software. For example, the process performed by the controllers 13 may also be implemented using user programmable integrated circuit such as a FPGA (Field-Programmable Gate Array) and a microcomputer. In this case, the integrated circuit may be used to implement a program that the controller 13 executes in this example.

(3) Estimation of Representative Position

Next, a method of estimating the representative position of the detected vehicle by the representative position determination unit 16 will be described. Schematically, after detecting the vehicle surface, the direction, and the size of the detected vehicle based on the vehicle segment, the representative position determination unit 16 estimates the entire area of the detected vehicle based on the detection result, and determines the representative position from the estimated entire area. Thus, the representative position determination unit 16 accurately determines the representative position of the detected vehicle regardless of the detection status of the detected vehicle by the lidar 3.

Figure 4A:
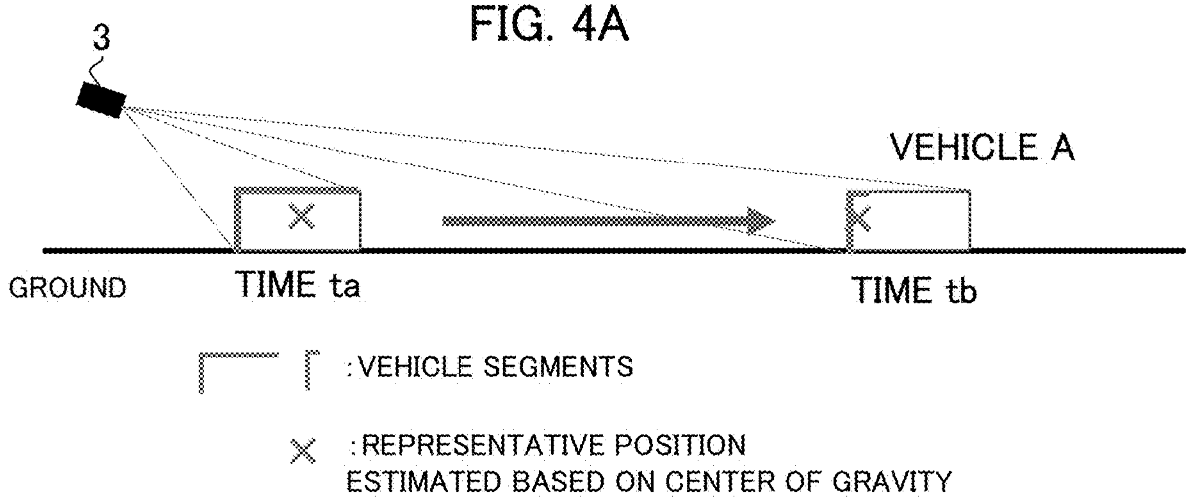
FIGS. 4A and 4B FIG. 4A is a side view showing a condition of a certain vehicle together with detected segments of the vehicle and the representative positions thereof according to a comparative example.
Figure 4B:
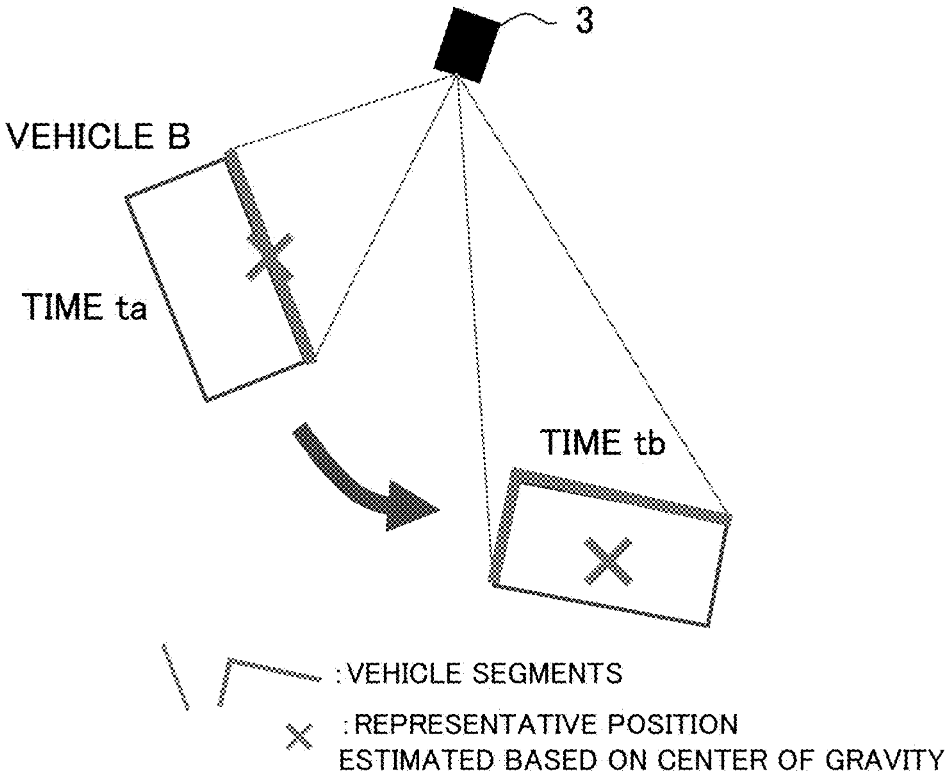

First, a description will be given of an issue of an example (comparative example) in which the position of the center of gravity of the vehicle segment is determined as a representative position of the vehicle. FIG. 4A is a side view showing vehicle segments of the vehicle A at the time ta and the time tb and the representative positions determined based on the comparative example, and FIG. 4B is a bird's-eye view showing the vehicle segments of the vehicle B at the time ta and the time tb and the representative positions determined based on the comparative example. In FIG. 4A and FIG. 4B, the directions in which the vehicle has advanced during the period from the time ta to the time tb are clearly indicated by the arrows, respectively.

In the example shown in FIG. 4A, at the time ta, the entire upper side surface and the entire rear side surface of the vehicle A are detected by the lidar 3, and a vehicle segment including the measured points thereof is generated. On the other hand, at the time tb, the entire rear side surface and a part of the upper side surface of the vehicle A are detected by the lidar 3, and a vehicle segment including the measured points thereof is generated. Consequently, according to the calculation method of the representative position in the comparative example, the representative position of the vehicle A becomes near the center of the vehicle A at the time ta, and becomes near the rear seat of the vehicle A at the time tb.

Similarly, in the example shown in FIG. 4B, at the time ta, the entire left side surface of the vehicle B is detected by the lidar 3, and a vehicle segment including the measured points thereof is generated. At the time tb, the entire left side surface and the entire rear side surface of the vehicle B is detected by the lidar 3, and a vehicle segment including the measured points thereof is generated. Consequently, the calculation method of the representative position according to the comparative example makes the representative position of the vehicle B become near the center of the left side surface of the vehicle B at the time ta and become near the center of the vehicle B at the time tb.

Thus, according to the comparative example, there is an issue that the representative position of the object varies depending on the appearance of the detected object visible from the lidar 3. Taking the above into consideration, in the present embodiment, the representative position determination unit 16 determines the representative position after estimating the entire area of the detected vehicle including a portion that is not visible from the lidar 3. Thus, the representative position determination unit 16 accurately detects the identical position in the detected vehicle as the representative position of the detected vehicle.

Figure 5:
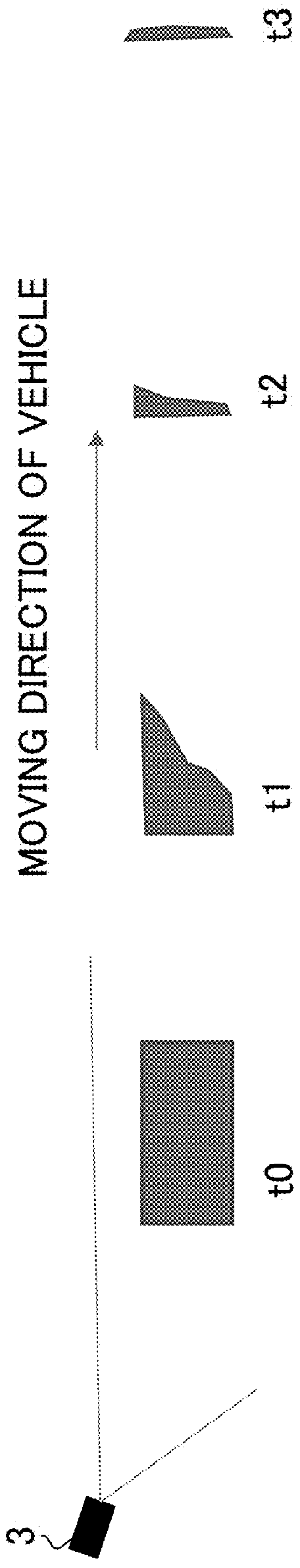
FIG. 5 It is a bird's-eye view showing vehicle segments in time series.

Next, details of the process executed by the representative position determination unit 16 will be described with reference to a specific example shown in FIG. 5. FIG. 5 is a bird's-eye view illustrating vehicle segments in time series at the time t0 to t3. In FIG. 5, a vehicle segment including the entire upper surface of the detected vehicle is generated at the time t0, and thereafter, the detection area of the upper side surface of the detected vehicle decreases as the vehicle moves over time. As a result, the upper side surface of the detected vehicle is hardly included in the vehicle segment at the time t3.

Figure 6:
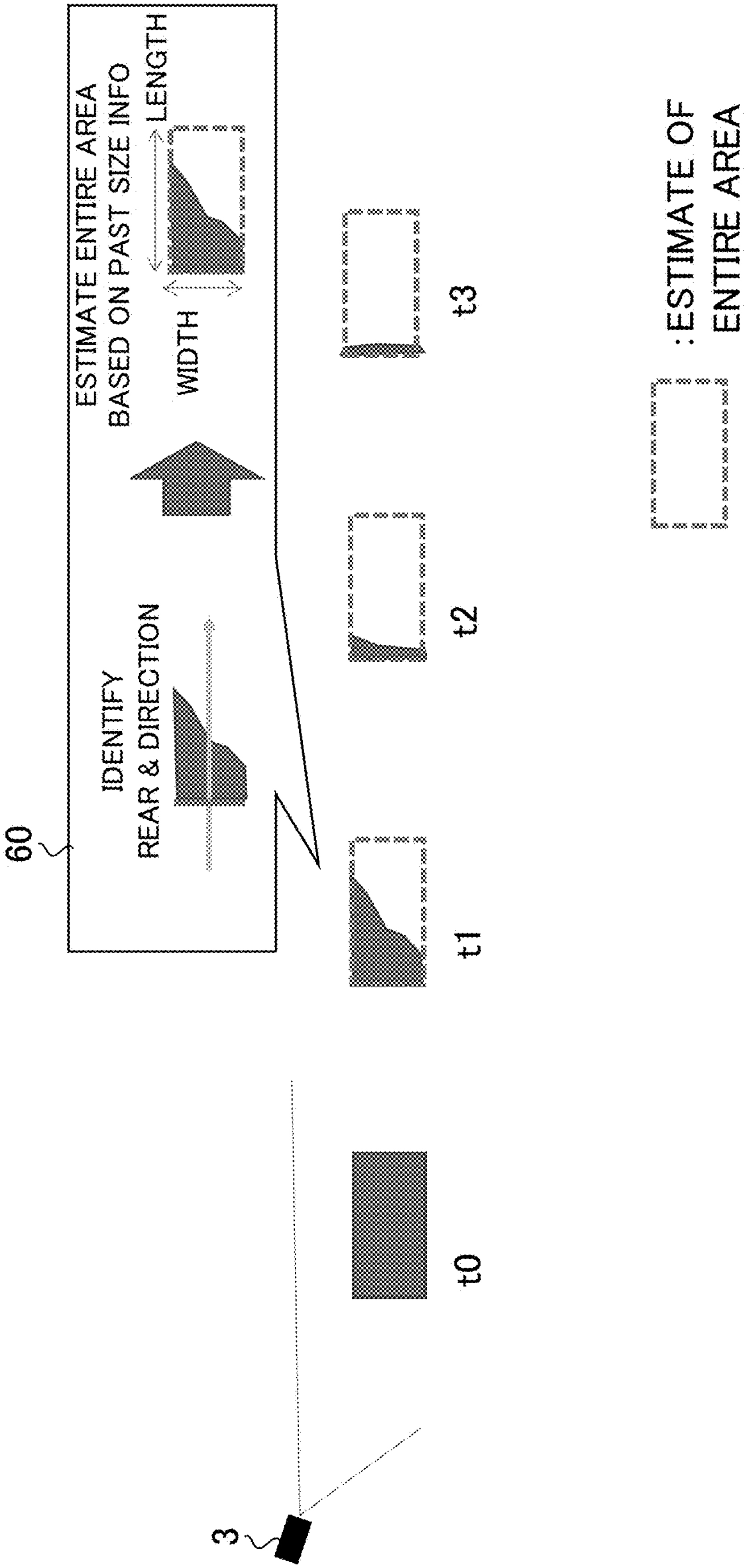
FIG. 6 It illustrates the entire areas of the vehicle to be estimated at respective times with broken bounding boxes.

FIG. 6 is a view clearly showing the entire area of the vehicle estimated at each time by a broken bounding box in the specific example shown in FIG. 5. Further, in FIG. 6, the balloon 60 shows the flow of the estimation process of the entire area of the detected vehicles at time t1. In this example, the representative position determination unit 16 determines that the surface of the vehicle segment on the side of the lidar 3 coincides with the surface of the detected vehicle on the side of the lidar 3, and that the detected vehicle with the size based on the past size information exists at its position.

First, a specific example will be given of the method of detecting the vehicle surface at the time t1. At the time t1, on the basis of the vehicle segment of the target detected vehicle acquired by the segment detection unit 15 at the time t1, the representative position determination unit 16 detects the vehicle surface of the detected vehicle. As an example, the representative position determination unit 16 detects the rear side surface of the detected vehicle in which a pair of reflectors, which are retroreflective materials, are included in the vehicle surface. It is noted that a pair of reflectors are provided on the rear of a typical vehicle.

In this case, for example, considering that the reflection intensity value of a measured point of a reflector is sufficiently higher than the reflection intensity value of any other measured point of the vehicle segment, the representative position determination unit 16 detects, as a reflector area, neighboring measured points, in the vehicle segment, having the reflection intensity value equal to or larger than a predetermined value. Then, the representative position determination unit 16 detects, as a vehicle surface, the surface (e.g., the measured points located on or around a plane obtained by the least squares method or the like from the measured points belonging to the reflector area) including the pair of reflectors. The representative position determination unit 16 may detect the specific vehicle surface (not necessarily the rear side surface) of the detected vehicle, on the basis of any technique other than the rear detection method of the detected vehicle based on the reflectors described above.

Furthermore, the representative position determination unit 16 identifies the direction of the detected vehicle on the basis of the normal direction perpendicular to the calculated vehicle surface. Specifically, the representative position determination unit 16 identifies the normal direction which is away from the lidar 3 as the direction of the detected vehicle.

Then, the representative position determination unit 16 estimates the entire area of the detected vehicle based on the past size information linked to the target detected vehicle. At the time t1, the past size information indicating the size of the detected vehicle estimated at the time t0 was already generated, and the representative position determination unit 16 estimates the entire area of the target detected vehicle by referring to the past size information. Here, as an example, the representative position determination unit 16 determines the representative position of the detected vehicle on the two-dimensional coordinates representing the position on the horizontal plane. Thus, considering the width and length as the size of the detected vehicle, the representative position determination unit 16 estimates the entire area of the detected vehicle as a a rectangular area having the rear side surface as a side and the identified direction as the longitudinal direction (length direction) of the rectangular area. Alternatively, the representative position determination unit 16 may estimate the entire area of the detected vehicle on the three-dimensional coordinates to obtain the representative position of the detected vehicle on the three-dimensional coordinates. In this case, the past size information includes a width and a length and a height representing the size of the detected vehicle, and the representative position determination unit 16 may estimate, as the entire area of the detected vehicle, a rectangular parallelepiped having the rear side surface of the detected vehicle as a side and the identified direction as the length direction of the rectangular parallelepiped.

At the time t2 and the time t3, the representative position determination unit 16 also performs the same process as the process at the time t1 to estimate the entire area of the detected vehicle. Even at the time t0, the representative position determination unit 16 may estimate the entire area of the detected vehicle using the past size information generated at the time t0 or the prior size information. The estimated entire area of the detected vehicle at the time t0 is a rectangular area roughly coincident with the outer edge of the vehicle segment.

Figure 7:
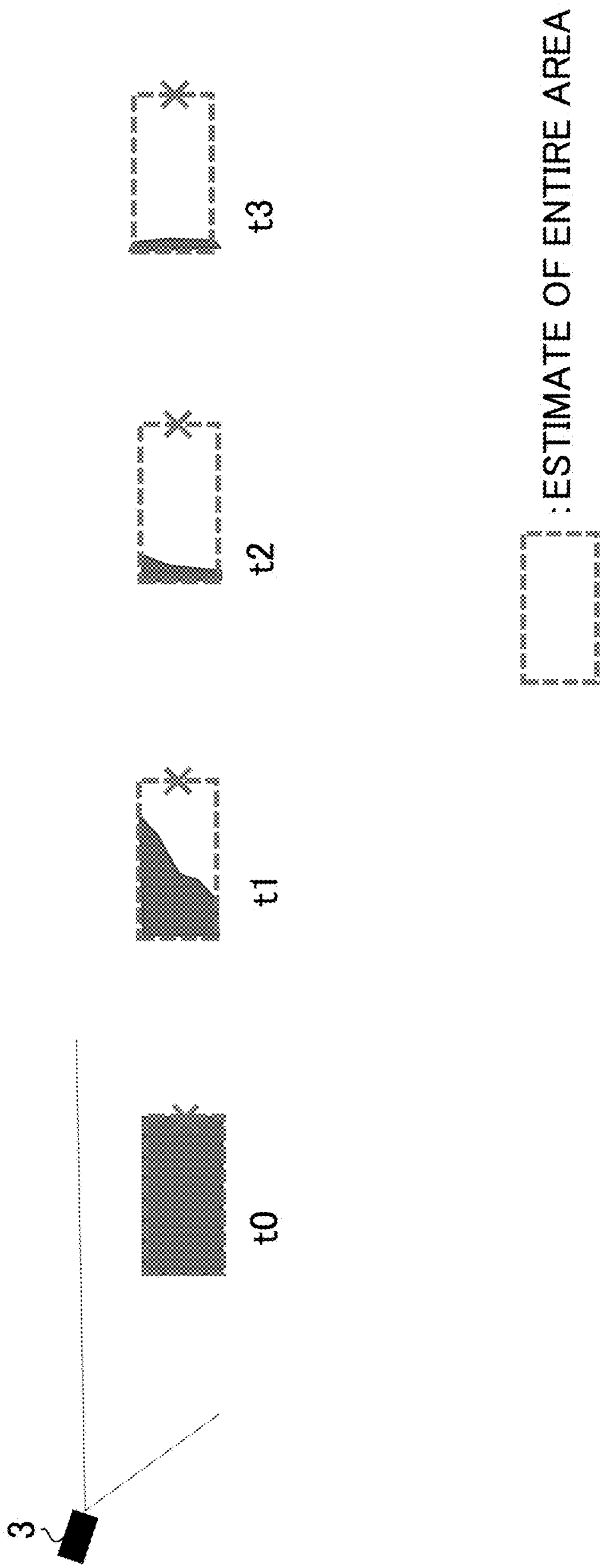
FIG. 7 It is a diagram clearly showing representative positions based on the entire areas of the vehicle to be estimated at respective times.

FIG. 7 illustrates the representative position of the vehicle estimated based on the entire area at each time using x mark over the specific example shown in FIG. 5. Here, as an example, the representative position of the detected vehicle is set to the central position of the head of the vehicle. Then, the representative position determination unit 16 identifies the center position of the head of the vehicle at each time based on the entire area estimated at each time and determines the identified position as the representative position of the detected vehicle. In this way, the representative position determination unit 16 can stably identify a predetermined position on the detected vehicle as a representative position in time series. Then, the representative position of the detected vehicle determined by the representative position determination unit 16 is suitably used for the tracking process.

Figure 8:
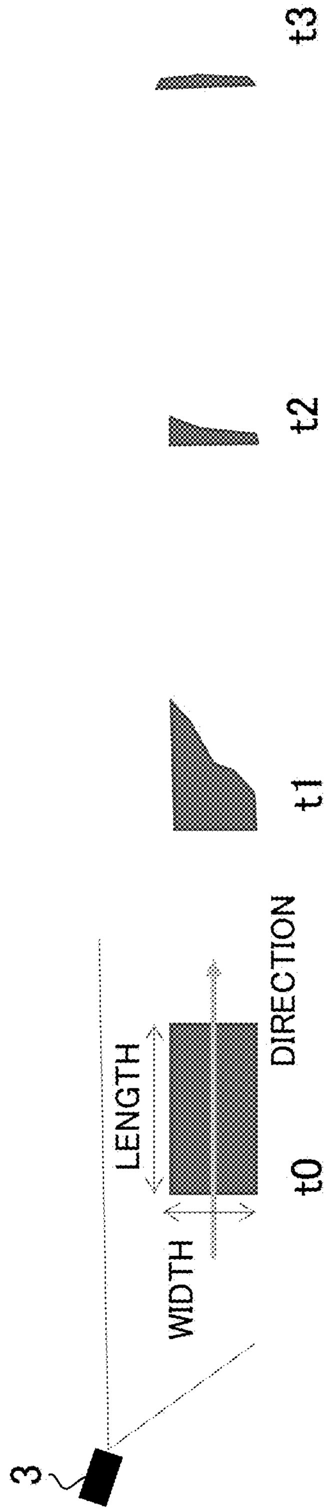
FIG. 8 It is a diagram showing an outline of the generation and update process of the past size information.

FIG. 8 is a diagram illustrating an outline of the process of generating and updating the past size information in the specific example shown in FIG. 5. The outline of the method of generating the past size information at the time t0 is illustrated herein.

The representative position determination unit 16 regards the detected vehicle as a rectangle whose longitudinal direction coincides with the direction of the detected vehicle in the two-dimensional coordinate space when the detected vehicle is viewed from above (i.e., the coordinate representing the height is deleted), and calculates the width and length of the rectangle. In this case, for example, the representative position determination unit 16 determines that the entire area of the detected vehicle is a minimum rectangle whose longitudinal direction coincides with the direction of the detected vehicle and which includes the vehicle segment on the above-described two-dimensional coordinate space. Then, the representative position determination unit 16 calculates the width and length of the rectangle as the width and length of the detected vehicle. In some embodiments, the representative position determination unit 16 may determine that the entire area of the detected vehicle is a minimum rectangular parallelepiped whose longitudinal direction coincides with the direction of the detected vehicle and which includes the vehicle segment on the three-dimensional coordinate space. In this case, the representative position determination unit 16 identifies the width, length, and height of the rectangular parallelepiped as the width, length, and height of the detected vehicle. The representative position determination unit 16 may use the direction based on the normal of the vehicle surface as the direction of the detected vehicle, or may identify the moving direction of the detected vehicle specified based on the transition of the representative positions as the direction of the detected vehicle. In addition, when the map information is stored in the memory 12, the representative position determination unit 16 may specify the direction of the detected vehicle based on the direction of the lane in which the detected vehicle exists.

Then, at the time t0, the representative position determination unit 16 generates past size information indicating the width and length (and height) of the detected vehicle calculated from the vehicle segment obtained at the time t0 in the above-described way, and stores the past size information in the memory 12 in association with the detected vehicle ID of the detected vehicle of interest. Further, even at each time of the time t1 to time t3, the representative position determination unit 16 calculates the size (width and length (and height)) of the detected vehicle on the basis of the vehicle segment obtained at the each time. Then, the representative position determination unit 16 updates the past size information by the calculated size if the calculated size is larger than the size indicated by the stored past size information. Since the calculated size becomes smaller than the size indicated by the stored past size information at each time of the time t1 to the time t3, the representative position determination unit 16 does not perform updating of the past size information.

In some embodiments, taking the noise immunity into consideration, the representative position determination unit 16 may not perform the estimation of the entire area of the detected vehicle on the basis of a huge rise estimated size. For example, the representative position determination unit 16 stores the history of the size estimated in the past for each detected vehicle as the past size information. Then, in estimating the entire area of the detected vehicle by referring to the past size information, the representative position determination unit 16 determines that the top N (N is an integer of 1 or more) estimates of the past estimated size are noises and does not use them for estimating the entire area. Then, the representative position determination unit 16 estimates the entire area based on the "N+1"th largest estimate of the size. Thus, the representative position determination unit 16 can more accurately estimate the entire area of the detected vehicle.

(4) Processing Flow

Figure 9:
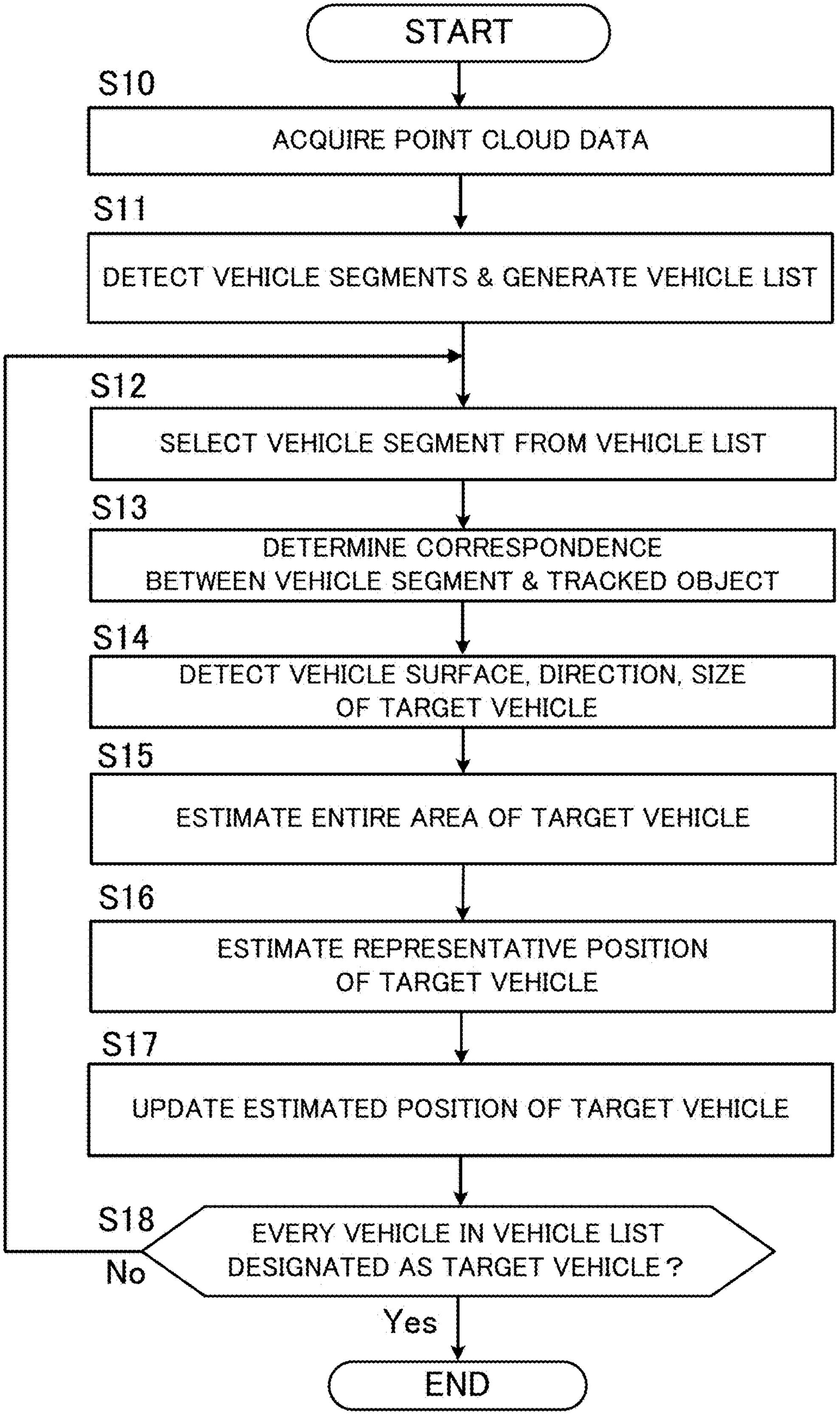
FIG. 9 It is an example of a flowchart showing the procedure of the vehicle detection process.

FIG. 9 is an example of a flowchart illustrating a procedure of a vehicle detection process that is executed by the information processing device 1. The information processing device 1 repeatedly executes the process of the flowchart for each processing cycle (e.g., a frame cycle of the lidar 3).

First, the controller 13 of the information processing device 1 acquires point cloud data measured by the lidar 3 via the interface 11 (step S10). Then, the controllers 13 detects vehicle segment(s) based on the point cloud data acquired at step S10 and generate the vehicle list LV which is the list of the detected vehicles used in the current processing cycle based on the detection result (step S11).

Next, the controller 13 selects the vehicle (target vehicle) to be processed at step S14 to step S17 from the vehicle list LV (step S12). Then, the controllers 13 perform a process of determining the correspondence between the vehicle segments of the target vehicle with the tracked object (step S13). The controller 13 then detects the vehicle surface, direction, and size of the target vehicle based on the vehicle segment (step S14). In this case, for example, the controller 13 detects a pair of reflector areas based on the reflection intensity values of the vehicle segment corresponding to the target vehicle, and detects the rear side surface of the target vehicle including the reflector areas as the vehicle surface. Further, for example, the controller 13 detects the direction of the target vehicle based on the normal of the detected vehicle surface. For example, the controller 13 also approximates the vehicle segment by a rectangle to estimate the width and length of the target vehicle. Further, the controller 13 updates the past size information based on the processing result at step S14.

Then, the controller 13 estimates the entire area of the target vehicle based on the processing result at step S14 (step S15).

Then, the controller 13 estimates the representative position of the target vehicle on the basis of the estimated entire area (step S16). In this case, the controller 13 can identify the predetermined position in the target vehicle as the representative position. Then, the controller 13 updates the estimated position of the target vehicle based on the representative position estimated at step S16 (step S17).

Then, the controller 13 determines whether or not every vehicle listed in the vehicle list LV have been designated as the target vehicle (step S18). Upon determining that every vehicle in the vehicle list LV has been designated as the target vehicle (step S18; Yes), the controller 13 terminates the process of the flowchart. On the other hand, upon determining that there is a vehicle that has not been designated as the target vehicle in the vehicle list LV (step S18; No), the controller 13 gets back to the process at step S12 and selects a vehicle that has not been designated as the target vehicle as the target vehicle.

(5) Modification

The lidar unit 100 may be mounted on the vehicle. In this instance, the lidar 3 is provided in a vehicle, and the information processing device 1 is an in-vehicle device of the vehicle or an electronic control device (ECU: Electronic Control Unit) incorporated in the vehicle. In this case, the information processing device 1 detects, based on the point cloud data generated by the lidar 3, a vehicle around the vehicle on which the lidar unit 100 is mounted. Even in this case, the information processing device 1 can accurately execute the tracking process of vehicles in the vicinity of the vehicle on which the lidar unit 100 is mounted.

In some embodiments, the target of tracking is not limited to a vehicle, and it may be any moving object. In this case, the segment detection unit 15 detects the segment of the target moving object of tracking, and the representative position determination unit 16 performs a process of determining the representative position of the target moving object of tracking based on the segment.

As described above, the controller 13 of the information processing device 1 according to this embodiment mainly functions as an acquisition unit, a surface detection unit, a direction estimation unit, and the entire area estimation unit. The acquisition unit is configured to acquire measurement data outputted by a measurement device. The surface detection unit is configured to detects at least one surface of an object from the measurement data. The direction estimation unit is configured to estimate a direction of the object based on the detected surface. The entire area estimation unit is configured to estimate an entire area of the object based on the estimated direction and the measurement data. Thus, even when only a part of the object can be measured by the measurement device, the information processing device 1 can suitably estimate the entire area of the object to stably determine the representative position of the object.

In the embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)).

While the present invention has been described with reference to the embodiments, the present invention is not limited to the above embodiments. Various modifications that can be understood by a person skilled in the art can be made to the configuration and details of the present invention within the scope of the present invention. Namely, the present invention includes, of course, various modifications that may be made by a person skilled in the art according to the entire disclosure including claims and technical ideas. In addition, all Patent and Non-Patent Literatures mentioned in this specification are incorporated by reference in its entirety.

DESCRIPTION OF REFERENCE NUMERALS

1, 1A Information processing device
2 Sensor group
3 Lidar
100 Lidar unit

What is claimed is:

1. An information processing device comprising:
at least one processor configured to:
acquire measurement data outputted by a measurement device;
detect at least one surface of an object from the measurement data;
estimate a direction of the object based on a normal direction perpendicular to the detected surface;
estimate a size of the object, based on a segment representing the object detected from the measurement data; and
estimate an entire area of the object, based on a history of the sizes estimated based on the measurement data in which the object is detected, the estimated direction, and the detected surface.

2. The information processing device according to claim 1,
wherein the at least one processor is configured to exclude a predetermined number of top sizes from the history and estimate the entire area.

3. The information processing device according to claim 1,
wherein the object is a vehicle, and
wherein the at least one processor is configured to detect the at least one surface of the vehicle from the measurement data.

4. The information processing device according to claim 3,
wherein the at least one processor is configured to;
detect data representing reflectors of the vehicle from the measurement data; and
detect a rear side surface of the vehicle based on the data.

5. The information processing device according to claim 1,
wherein the measurement device generates the measurement data including a reflection intensity value for each measurement direction by receiving reflected light of emitted light, and
wherein the at least one processor is configured to detect the surface based on the reflection intensity value.

6. The information processing device according to claim 1,
wherein the at least one processor is configured to determine a representative position of the object based on the entire area.

7. The information processing device according to claim 6,
wherein the at least one processor is configured to track the object based on transition of the representative position in time series.

8. The information processing device according to claim 1,
wherein the at least one processor is configured to detect the at least one surface based on the segment.

9. A control method executed by a computer, the control method comprising:

acquiring measurement data outputted by a measurement device;

detecting at least one surface of an object from the measurement data;

estimating a direction of the object based on a normal direction perpendicular to the detected surface;

estimating a size of the object, based on a segment representing the object detected from the measurement data;

estimating an entire area of the object, based on a history of the sizes estimated based on the measurement data in which the object is detected, the estimated direction, and the detected surface;

determining a representative position of the object based on the estimated entire area; and tracking the object based on a transition of the determined representative position in time series.

10. A non-transitory computer readable medium storing a program causing a computer to:

acquire measurement data outputted by a measurement device;

detect at least one surface of an object from the measurement data;

estimate a direction of the object based on a normal direction perpendicular to the detected surface;

estimate a size of the object, based on a segment representing the object detected from the measurement data;

estimate an entire area of the object, based on a history of the sizes estimated based on the measurement data in which the object is detected, the estimated direction, and the detected surface;

determine a representative position of the object based on the estimated entire area; and track the object based on a transition of the determined representative position in time series.

* * * * *